United States Patent
Gusler et al.

(10) Patent No.: US 6,938,057 B2
(45) Date of Patent: Aug. 30, 2005

(54) METHOD AND APPARATUS FOR NETWORKED BACKUP STORAGE

(75) Inventors: Carl Phillip Gusler, Austin, TX (US); Rick A. Hamilton, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/316,752

(22) Filed: May 21, 1999

(65) Prior Publication Data

US 2002/0156965 A1 Oct. 24, 2002

(51) Int. Cl.$^7$ .............................. G06F 17/30
(52) U.S. Cl. ..................................... 707/204
(58) Field of Search ........................ 707/204, 200, 707/205, 10; 711/162

(56) References Cited

U.S. PATENT DOCUMENTS

| | | | |
|---|---|---|---|
| 5,133,065 A | 7/1992 | Cheffetz et al. ............. 714/2 |
| 5,742,792 A | 4/1998 | Yanai et al. ............... 711/162 |
| 5,751,997 A | 5/1998 | Kullick et al. ............. 711/162 |
| 5,761,404 A | * 6/1998 | Murakami et al. ........... 714/5 |
| 5,771,354 A | * 6/1998 | Crawford ................. 709/229 |
| 5,778,395 A | * 7/1998 | Whiting et al. ............ 707/204 |
| 5,799,147 A | 8/1998 | Shannon ................... 714/6 |
| 5,819,020 A | * 10/1998 | Beeler, Jr. ............... 714/5 |
| 5,835,915 A | * 11/1998 | Carr et al. ............... 707/202 |
| 5,852,713 A | 12/1998 | Shannon ................... 714/6 |
| 5,857,208 A | * 1/1999 | Ofek ..................... 707/204 |
| 6,026,414 A | * 2/2000 | Anglin ................... 707/204 |
| 6,047,294 A | * 4/2000 | Deshayes et al. .......... 707/204 |
| 6,205,450 B1 | * 3/2001 | Kanome ................... 707/203 |
| 6,378,054 B1 | * 4/2002 | Karasudani et al. ........ 711/161 |

* cited by examiner

*Primary Examiner*—Greta Robinson
(74) *Attorney, Agent, or Firm*—Duke W. Yee; David A. Mims, Jr.; Betty Formby

(57) ABSTRACT

A method and apparatus in a distributed data processing system for backing up data on a computer. A backup image of the data in the computer is created, wherein the backup image is stored in a location in the computer. The backup image from the location in the computer is requested by a server.

33 Claims, 10 Drawing Sheets

```
#!/bin/ksh
##########################################################################

#   node_mksysb.ksh       Version 1.00
#               Runs various AIX commands to create a local
#                  mksysb image

#                  Assembled by Carl Gusler and Rick Hamilton
IBM Global Services
IBM Austin
cgusler@us.ibm.com, rh@us.ibm.com

(With help from many friends)

Copyright IBM 1996, 1997, 1998
Controlled Distribution
Protected under the procedures, processes, rights
rules, regulations, and retributions of
IBM Global Services
Intellectual Property Management

##########################################################################

#-------------------------------------------------------------------------

#   Copyright Information:  Copyright IBM 1998
#            Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
#            1. Backup/archivae copies taken as a normal
#               course of system maintenance.
2. Copying the program to a similar machine
within the same enterprise.

The customer agrees to restrict access to this
program as they would their own proprietary code,
and to notify IBM should unauthorized distribution
occur.

This program is distributed on an "as is" basis,
no warranty is expressed or implied.

```

```
#---------------------------------------------------

#   Operational Environment: Tested at AIX V4.2.1 and PSSP V2.3

#   Comments:

#---------------------------------------------------

#---------------------------------------------------

#   Version History:   None

#---------------------------------------------------

#---------------------------------------------------

#   Environmental Variables

#---------------------------------------------------
TARGET_DIR=/tmp/mksysb
TODAY=$(date +%d%b%Y)
IMAGE_NAME=bos.obj.$(hostname | cut -d"." -f1).$TODAY

#---------------------------------------------------

#   Usage Message:   None

#---------------------------------------------------
USAGE="USAGE: node_mksysb"

#---------------------------------------------------

#   Function:   None
#       Description:

#---------------------------------------------------

#---------------------------------------------------

#   Main Routine

#---------------------------------------------------
#   Verify that target directory is mounted         } 802
    mount $TARGET_DIR >/dev/null 2>&1

#   Remove old mksysb images                        } 804
    rm -f $TARGET_DIR/bos.obj.*

#   Create mksysb
    /usr/bin/mksysb -i -e $TARGET_DIR/$IMAGE_NAME 1>/dev/null 2>&1  } 806
```

```
#!/bin/ksh
########################################################################

# cws_collect_mksysb.ksh
#                 Version 1.00
#            Runs various AIX commands to collect mksysb images
#                    created on the SP nodes to the CWS

#                   Assembled by Carl Gusler and Rick Hamilton
IBM Global Services
IBM Austin
cgusler@us.ibm.com, rh@us.ibm.com

(With help from many friends)

Copyright IBM 1996, 1997, 1998
Controlled Distribution
Protected under the procedures, processes, rights
rules, regulations, and retributions of
IBM Global Services
#                 Intellectual Capitol Management

#########################################################################
#----------------------------------------------------------------------

# Copyright Information:   Copyright IBM 1998
#             Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
#                 1. Backup/archive copies taken as a normal
#                    course of system maintenance.
2. Copying the program to a similar machine
within the same enterprise.

The customer agrees to restrict access to this
program as they would their own proprietary code,
and to notify IBM should unauthorized distribution
occur.

This program is distributed on an "as is" basis,
no warranty is expressed or implied.
```

```

#------------------------------------------------
#------------------------------------------------

# Description: Perform and log mksysb collection from nodes to CWS
# Operational Environment: Tested at AIX V4.2.1 and PSSP V2.3
# Input:
# Output:
# Return Value:
# Comments:

#------------------------------------------------

#------------------------------------------------

# Version History:   None

#------------------------------------------------

#------------------------------------------------

# Environmental Variables

#------------------------------------------------
# Constants

# Variables
numeric_date=$(date +%m%d%y)
text_date=$(date +%d%b%Y)
typeset -i return_code
typeset -i retain_days=90
typeset -i in_retain_days
invoked_name=$0
script_name=${invoked_name##*/}

# Process Control Variables
l_flag=0
L_flag=0
r_flag=0

Files source_dir=/tmp/mksysb
target_dir=/spdata/sys1/node.data
log_file=/dev/null
default_log_dir=/var/adm/scriptlogs
default_log_file=$script_name.$text_date

```
# Function: show_usage
#       Description: Displays command usage syntax and exits
#       Input: None
#       Output: Usage message to standard error
#       Return Value: 2
#       Note: This fuction does not return. It completely exits.

#----------------------------------------------------------------
show_usage ()
{
    print -u2 "                    "
    print -u2 "Usage: cws_collect_mksysb.ksh [-l directory]  [-r days]   [ -L ]"
    print -u2 "              -l directory    Log output directory."
    print -u2 "                              Default is" $default_log_dir
    print -u2 "        "
    print -u2 "              -L              Log results and status."
    print -u2 "        "
    print -u2 "              -r days         Log retention period."
    print -u2 "                              Default is" $retain_days
    print -u2 "        "
    exit 2
}
#----------------------------------------------------------------

# Korn Shell Settings

#----------------------------------------------------------------
#set -o errexit         # Turn on error trapping and error exit mode
#set -o noclobber       # Prevent overwriting of existing files
#set -o noexec          # Perform syntax checking without execution
#set -o nolog           # Prevents storing function defs in history file
#set -o xtrace          # Turn on debug mode

#----------------------------------------------------------------

# Main Routine

#----------------------------------------------------------------

# Test for any passed parameters.
#if [ $? != 0 ]
#then
#       show_usage
#fi

log_dir=$default_log_dir
# Parse Command Line Arguments into Variables
while getopts l:hLr# c
do
    case $c in
        L)      # Set up the -L flag
                L_flag=1;;
        l)      # Set up the -l flag
```

```
                    L_flag=1
                    log_dir=$OPTARG;;
         r)         # Set up the -r flag
                    r_flag=1
                    in_retain_days=$OPTARG;;
         h)         show_usage;;
         :)         show_usage;;
         \?)        show_usage;;
      esac
done
shift $ ((OPTIND-1))
# Deal with invocation errors

# Perform Work
if [[ $L_flag -eq 1 ]]; then
    log_file=$default_log_dir/$default_log_file
    mkdir -p $default_log_dir 2>/dev/null    # Create log directory
fi
if [[ $1_flag -eq 1 ]]; then
    L_flag=1
    log_file=$in_log_dir/$default_log_file
    mkdir -p $in_log_dir 2>dev/null          # Create log directory
fi
if [[ $r_flag -eq 1 ]]; then
    retain_days=$in_retain_days
fi

# Clear old logs
find $log_dir -name "cws.collect.mksysb.log*" -mtime $retain_days -exec rm {} \;

# Create new logs
if [[ $L_flag -eq 1 ]]; then
    exec 3>> $log_file # Open log file for writing
    print -u3 "\n-------------------------------------------------"
    print -u3 " Starting collection of node mksysbs on" $(hostname) " at" $(date)
fi for node in $(/usr/lpp/ssp/bin/SDRGetObjects Node reliable_hostname | grep -v
reliable_hostname | sort -r)
do
if [[ $L_flag -eq 1 ]]; then print -u3 " Collecting files from directory" $source_dir "on node" $node "at"
$(date)
fi /usr/lpp/ssp/kerberos/bin/rcp $node:$source_dir/bos.obj.* $target_dir 2>/tmp/cws.err
cat /tmp/cws.err >>$log_file
    print " Collected files from directory" $source_dir "on node" $node "at" $(date)
done if [[ $L_flag -eq 1 ]]; then
        print -u3 "\n Completed at" $(date)
    print -u3 "\n-------------------------------------------------"
    exec 3<&-
fi
```

FIG. 9D

METHOD AND APPARATUS FOR NETWORKED BACKUP STORAGE

BACKGROUND OF THE INVENTION

1. Technical Field

The present invention relates generally to an improved data processing system and in particular to a method and apparatus for managing data in a distributed data processing system. Still more particularly, the present invention provides a method and apparatus for backing up data in computers within a distributed data processing system.

2. Description of Related Art

In today's computing environment in which the maintenance of data is essential to many business functions, backup storage devices provide a low cost storage onto which computers connected to storage devices can create backup copies of files for later recovery if the original files on the computers are lost or corrupted.

All of the data and applications on all storage media and all nodes or clients of a network should be periodically backed up to allow restoration of files that may become corrupted or destroyed because of hardware or software failures that cause files to be inadvertently deleted or changed.

Presently, backup utility programs are present for multi user systems, network file servers, and work stations, which copy program and data files, usually in a compressed structure, onto backup media, such as, for example, magnetic tapes or optical disks. Typically, most backup programs allow disk backup or selective backup of files based on a file directory tree and a variety of file selection criteria.

Typically, data is copied from a first computer to a primary storage device and subsequently from a primary storage device to a lower cost, higher density secondary storage device, such as a magnetic tape or optical disk. This type of procedure is commonly known as "backing up" the system. In an environment where multiple personal computers or workstations are networked together, it is burdensome to back up each computer individually because a backup of the computer is typically initiated by a person. At times, that person may forget to back up a computer and if the data has been lost or corrupted, the data may be irretrievable because no archive or copy of the data is present. Typically, a network administrator or other information systems manager will oversee the backup of computers to check that each machine is backed up on a regular basis. Such an approach is labor intensive and burdensome.

In many network systems, the workstations or nodes in the system do not have individual tape drives for backup. As a result, any backup of data from these types of network computers must be sent to a control workstation or other server for storage. With a large installation, tens or even hundreds of computers may be present. Each of these computers will have hard disk capacities, which may be measured in hundreds of megabytes. Backing up of such systems may provide a significant challenge in avoiding significant network bottlenecks.

Therefore, it would be advantageous to have an effective method and apparatus for backing up computers in a network.

SUMMARY OF THE INVENTION

The present invention provides a method and apparatus in a distributed data processing system for backing up data on a computer. A backup image of the data in the computer is created, wherein the backup image is stored in a location in the computer. The backup image from the location in the computer is requested by a server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A & 8B are diagrams illustrating a script used to initiate creation of a local backup image depicted in accordance with a preferred embodiment of the present invention; and FIGS. 9A–9D are diagrams illustrating a script used by a server to collect images from various clients depicted in accordance with a preferred embodiment of the present invention.

DETAILED DESCRIPTION OF THE PREFERRED EMBODIMENT

Figure 1:
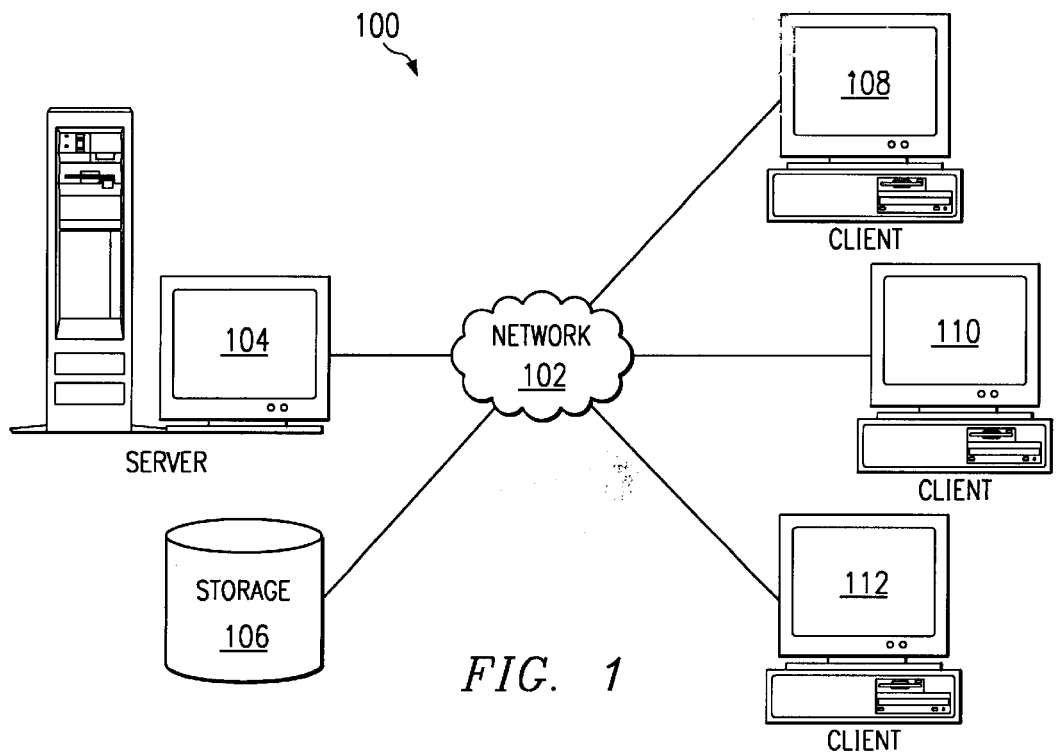
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is a RS/6000 based network system with hardware, such as RISC System/6000 servers and workstations available from International Business Machines Corporation. RISC System/6000 hardware is available from International Business Machines Corporation. RISC System/6000 computers combine UNIX computing with reduced instruction set computer (RISC) technology. "RISC System/6000" is a trademark of International Business Machines Corporation. In particular, these types of workstations and servers may be connected in a network to form a RS/6000 SP system in which workstations are called nodes or clients and a control workstation acts as a point of control for maintaining nodes and as a boot/install server for other servers in the system. Further, a control workstation also may be set up as an authentication server, a primary server with a master database and administration service as well as ticket granting service. Alternatively, a control workstation may be set up as a secondary server. In such a system, AIX provides the operating system functions for the various computers. "AIX" is a trademark of International Business Machines Corporation. AIX provides UNIX functionality along with conformance to industry standards for open systems.

Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
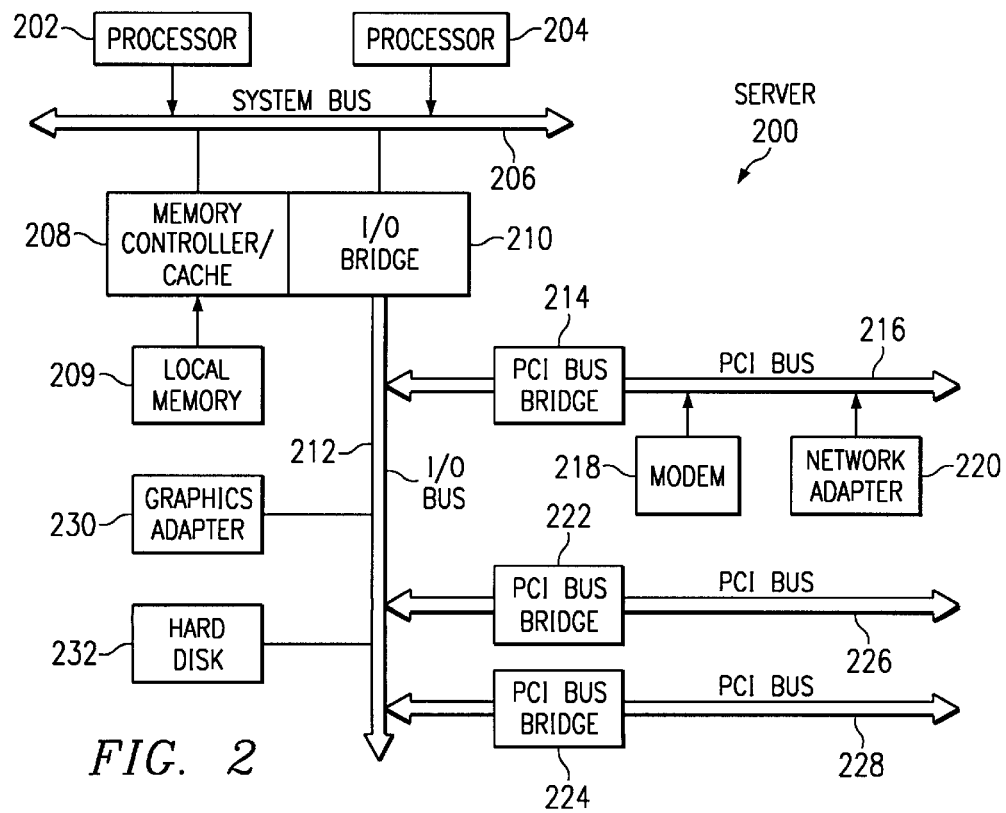
FIG. 2 is a block diagram which depicts a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000 system, a product of International Business Machines Corporation in Armonk, N.Y., running the Advanced Interactive Executive (AIX) operating system.

Figure 3:
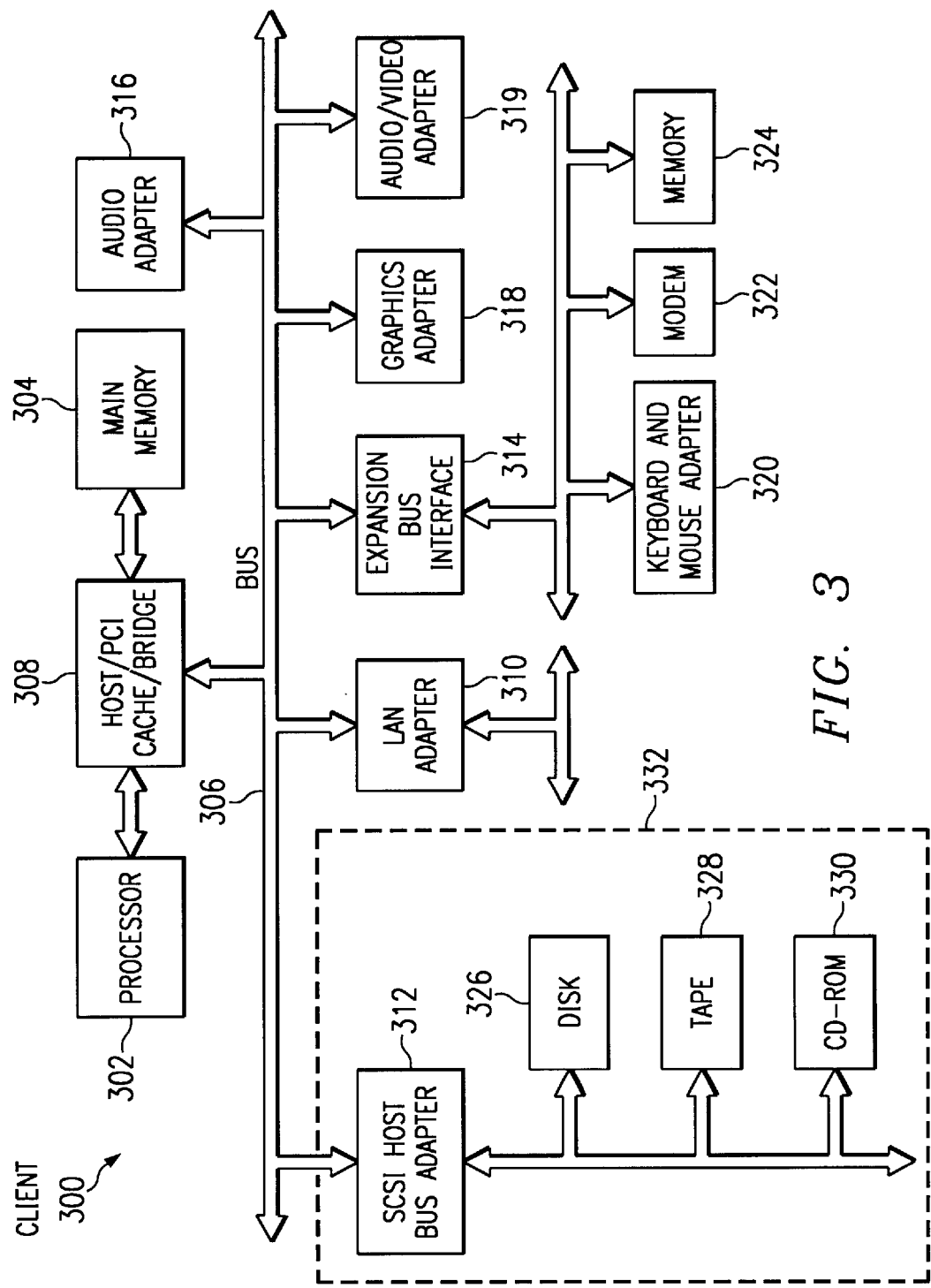
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2 or AIX, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. Data processing system 300 also may be implemented using a RS/6000 computer.

The depicted example in FIG. 3 and above-described examples are not meant to imply architectural limitations.

The present invention provides a method, apparatus and instructions for networked backup storage. In particular, the present invention provides a mechanism to minimize network traffic, by reducing network overhead and streamlining operations by reducing the server overhead required to create backups of a node or client. Typically, many networked installations accomplish backups by using a network file system (NFS) protocol available from Sun Microsystems, Inc. A NFS mount protocol is employed to mount a directory from the control workstation. A backup is then conducted over the network file system, using structures, guidelines, and overhead imposed by the NFS protocol. Once the backup image, typically with a size measured in hundreds of megabytes, has been transferred to the control workstation, this backup image may be offloaded to a tape or optical disk, if desired. This mechanism, however, in the NFS framework, incurs unnecessary overhead.

The mechanism of the present invention overcomes this problem by mounting a local file system on which to create a local copy of the backup, typically called a "MKSYSB" backup on IBM AIX systems. Any old images that may be within the client's file system for the backup are removed. Thereafter, a backup image is created within that file system keying its name with the current date. These steps are performed by the node. Later, collection of backup images is initiated by the control workstation. A system data repository (SDR) is queried to identify all of the node host names so that the control workstation will have a list of nodes from which images are to be retrieved. The system data repository is a database of information about the various clients that the server is supporting. The system data repository contains recovery and installation information, such as client names, host names, IP addresses, installation status, and so forth. In the depicted examples, this collection of backup images from the nodes is initiated by invoking a script with option flags for directories, viewing result logs, and log retention. A log directory is created at the control workstation if required. Old log entries also are removed if required. A remote copy (RCP) is used to initiate pulling of the backup image, if present, from the identified directory on the node or client and place it in the appropriate local directory in the control workstation. Log entries are made to identify whether retrieval of images is successful and, if not, the problems that may have occurred. RCP is a transmission control protocol/internet protocol (TCP/IP) sub-protocol similar to the file transfer protocol (FTP).

Figure 4:
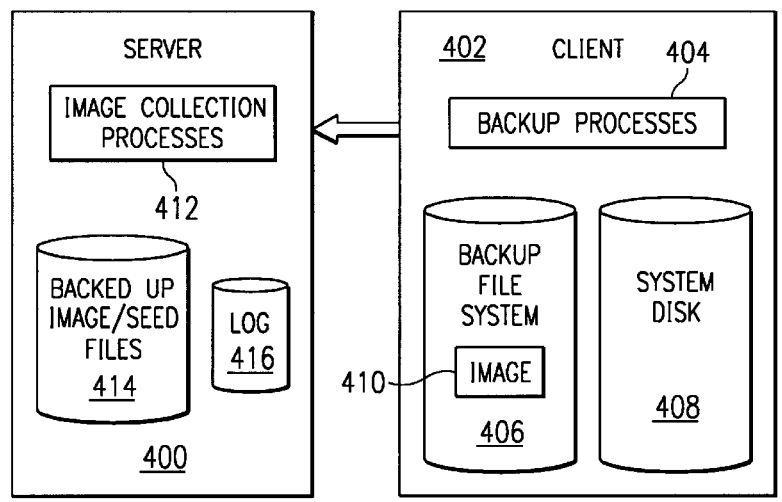
FIG. 4 is a diagram illustrating the backup process of the present invention depicted in accordance with a preferred embodiment of the present invention.

With reference now to FIG. 4, a diagram illustrating the backup process of the present invention is depicted in accordance with the preferred embodiment of the present invention. In this example, server 400 pulls backup images from client 402. Server 400 also may be referred to as a control workstation, and client 402 also may be referred to as a node.

Backup processes 404 in client 402 are used to mount a backup file system 406 locally in client 402. A copy of file system 408 may be made to create an image 410. In the depicted examples, image 410 is a fixed image of system disk 408, which may contain applications, data files, and configuration data. This process provides a local copy of the backup image. Image collection processes 412 in server 400 are used to "pull" images from various clients, such as client 402 in the distributed data processing system. In the depicted example, backup processes 404 and image collection processes 412 are implemented as scripts on the respective data processing systems. In particular, these scripts are implemented in a script designed for UNIX, referred to as a korn shell script language.

These backup images are stored in storage device 414, which contains the back up images from the various clients. These backup images can then be used as seed files, or backup images that may be used to initiate booting and reinstallation of a client in the event of a client system failure. Seed files are images that may be used to initiate booting of a client if a backup image is not available. Further, image collection processes 412 also may create a log 416 to record the results of pulling images from various clients. These results may include reporting of the success or failure of a request for an image. For example, a backup image may not be present within the backup file system when server 400 requests an image from the client. Further, the retrieval of the image may be faulty or have errors. Such events may be logged in log 416.

Figure 5:
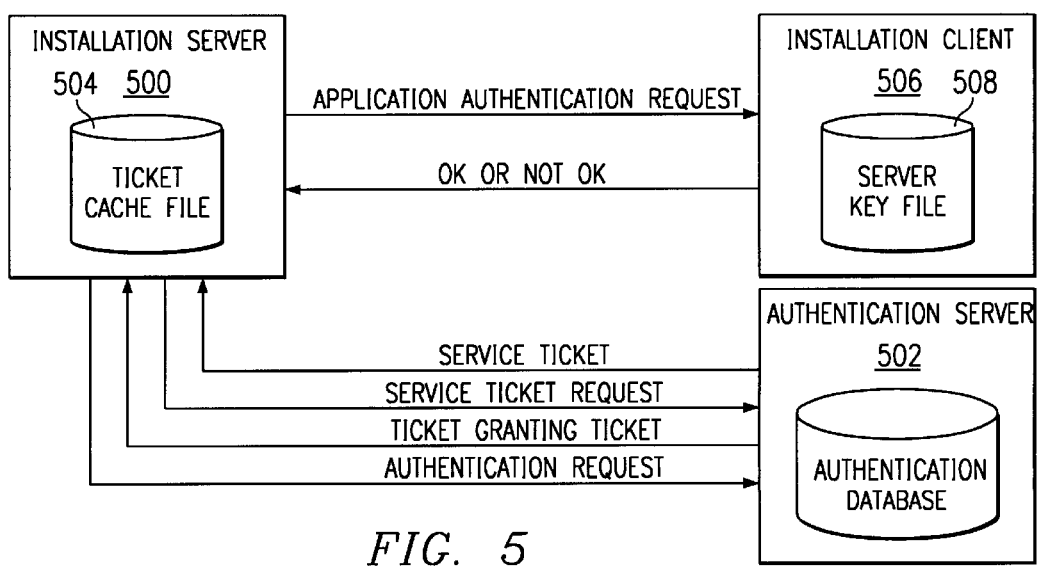
FIG. 5 is a diagram illustrating an authentication process used in retrieving backup images depicted in accordance with a preferred embodiment of the present invention.

With reference now to FIG. 5, a diagram illustrating an authentication process used in retrieving backup images is depicted in accordance with the preferred embodiment of the present invention. In the depicted examples, Kerberos is used as the authentication service to provide for the authentication used in retrieving images in accordance with the preferred embodiment of the present invention. In this invention, the control workstation or installation server requests authentication from the authentication server before requesting that the node or installation client provide transfer of the backup image. The authentication server may be the same machine as the installation server. In FIG. 5, the control workstation is depicted as an installation server 500. The installation client (or node) is depicted as client 506. Kerberos is a widely accepted authentication system available from the Massachusetts Institute of Technology.

In this specific example in FIG. 5, a client process on server 500 sends a message to the authentication service in authentication server 502. The message contains the identifier of the client, the identifier of the ticket granting service, and authentication server 502. This particular message is not encrypted in these examples. Authentication server 502 generates a random session key to be shared by server 500 and authentication server 502. Keys in this example are similar to passwords in that they are used for encrypting tickets being sent back and forth between a client and a computer, acting as a server. This ticket is returned to server 500 and stored in ticket cache file 504. In the depicted example, a client makes a request to another computer. This request is to a computer that provides service to the client's request. The computer will provide authentication information for both the client and the computer. In this example, tickets are encrypted byte strings returned to clients by an authentication server. A ticket contains the client principal's identifier, a timestamp, and a ticket lifetime used to determine the expiration time, the session key, and other information, all encrypted in a private key of the service instance with whom the client wishes to authenticate. Caching of tickets in ticket cache files, such as ticket cache file 504, takes place automatically on the client system. These files are created with UNIX permissions set so that they can be accessed only by the owner. A ticket service request may be initiated by a user at server 500. An authenticator, containing the client identifier and a current time stamp, is encrypted using the session key returned with the ticket granting ticket from server 502.

A service ticket request is then sent to authentication server 502. When the ticket granting ticket is received by server 500, if the key is used to successfully decrypt the returned message block containing the session key, a client identifier, and a ticket, the ticket and session key are stored in ticket cache file 504.

In response to the message, a service ticket may be returned to server 500, which contains the private key of the application on the principal, such as client 506. This ticket contains a session key and a ticket, encrypted in the private key of client 506. Server 500 retrieves this session key and ticket and uses them to send a message to client 506, which client 506 uses to determine whether server 500 is authenticated. The success or failure of this message is returned to server 500. The application server decrypts the request from the client using a private key from server key file 508. A standard data encryption standard (DES) algorithm is used for the data encryption in these examples.

Figure 6:
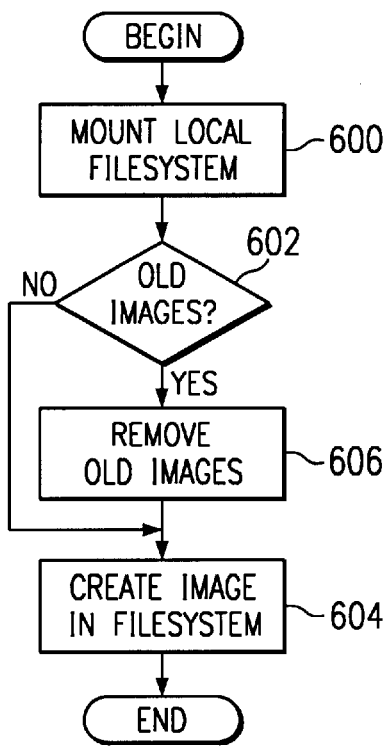
FIG. 6 is a flowchart of a process used by a client to create a local image depicted in accordance with a preferred embodiment of the present invention.

With reference now to FIG. 6, a flowchart of a process used by a client to create a local image is depicted in accordance with the preferred embodiment of the present invention. The process begins by mounting a local file system (step 600). The mounting of a local file system is the equivalent of making the file system visible or usable by the client. An unmounted file system is considered to be offline in these examples. A determination is then made as to whether old images are present in the local file system (step 602). If old images are not present, the process then creates a backup image in the file system (step 604) with the process terminating thereafter. This image is a copy of the applications, data files, and configuration in the client. Alternatively, depending on the implementation, only data might be stored in the backup with program files being excluded.

With reference again to step 602, if old images are present in the file system, the old images are removed (step 606) and the process then proceeds to step 604 to create a file system image.

Figure 7:
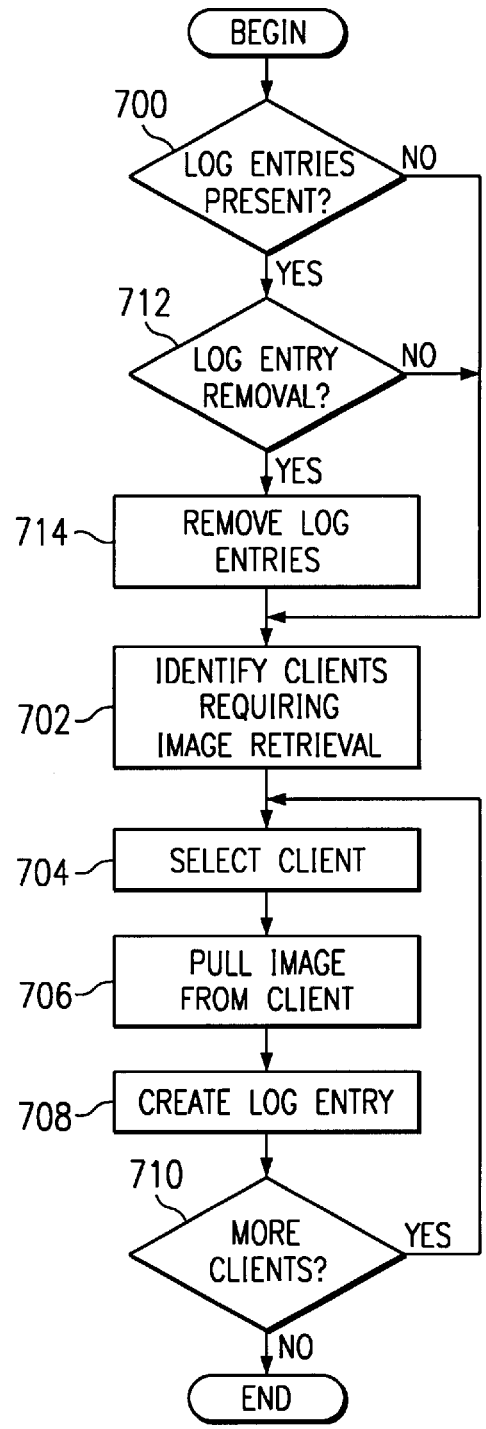
FIG. 7 is a flowchart of a process implemented by a server to retrieve backup images from clients depicted in accordance with a preferred embodiment of the present invention.

With reference now to FIG. 7, a flowchart of a process implemented by a server to retrieve backup images from clients is depicted in accordance with the preferred embodiment of the present invention. This process is used by a server to asynchronously initiate collection of backup images from clients on the network. The process begins by determining whether log entries are present (step 700). The log entries identified here are log entries used to identify the events occurring during retrieval of images. If log entries are not present, then clients requiring image retrieval are identified (step 702).

In the depicted examples, these clients are identified from a system data repository (SDR), which contains all names and identifiers for clients. This system data repository may contain the names of clients from which backup images are to be retrieved. Alternatively, an identifier or flag, associated with entries for clients, may be used to identify selected clients within this repository as clients from which backup images are to be retrieved. Thereafter, a client from the identified clients is selected (step 704). The image is then pulled from the client (step 706). This image is pulled in the depicted examples by executing a remote copy command to the node. Thereafter, a log entry is created (step 708). This will initiate the creation of a log if the log was not present before. A determination is then made as to whether additional clients are present from which backup images have not been retrieved (step 710). If additional clients are present, the process then returns to step 704 to select the next client from which a backup image has not been retrieved. Otherwise, the process terminates.

With reference again to step 700, if log entries are present, a determination is made as to whether log removal is to occur (step 712). This log removal step may be employed to remove log entries or log files when these log entries or files are older than some selected date or over a certain size. If log removal is to occur, the log entries are removed according to whatever policy has been employed (step 714). This policy can be based on the age of the log entries or the size of the log (i.e., number or entries), or by other factors. Thereafter, the process proceeds to step 702 as described above. The process also proceeds to step 702 if log entry removal is not to occur in step 712.

With reference now to FIGS. 8A & 8B, diagrams illustrating a script used to initiate creation of a local backup image are depicted in accordance with a preferred embodiment of the present invention. Script 800 in FIGS. 8A & 8B is an example of an implementation of the process illustrated in FIG. 6 for creating a local backup image at a client. The script illustrated in these diagrams is designed for UNIX, but the processes performed by the script may be applied to other types of operating systems to perform backups of clients. Section 802 in script 800 in FIG. 8B is used to verify that the target directory for the image to be backed up is mounted. Section 804 is used to remove any old backup images. Section 806 is used to create the backup image in the target directory.

With reference now to FIGS. 9A–9D, diagrams illustrating a script used by a server to collect images from various clients is depicted in accordance with a preferred embodiment of the present invention. The script also is in UNIX, although the processes illustrated by the script may be applied to other types of operating systems for collecting images. Section 902 in script 900 of FIG. 9A contains various variables and settings for these variables. Section 904 of script 900 contains instructions for processing logs. The actual collection of images is initiated and performed in section 906 of script 900 in FIG. 9C.

Thus, the present invention provides an improved method and apparatus for backing up clients on a network. The present invention avoids bottlenecks in networks caused by nodes backing up using traditional procedures. The present invention provides this advantage by first locally generating a backup image in a file system on a client. This backup image may be collected by a server at a later time. The image in this example is collected or pulled from a client using a remote copy command.

This mechanism may provide a 40 percent speed increase over the conventional method for backing up nodes or clients. Most current conventional methods utilize the Network File System (NFS) to access remote disk drives during the backup process. NFS presents significant network transfer overhead and inefficiencies. As the number of nodes increases, and as the size of the system image on each node increases, the speed-up can significantly and positively impact network traffic.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although in the depicted example the data processing system described was one using RS/6000 computers, the processes of the present invention may be implemented in other types of data processing systems. Further, even though UNIX was the example used to described the operating system in which these processes occur, the processes also may be applied to other types of operating systems, such as Windows 95 or Windows from Microsoft Corporation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for backing up data from a client computer, the method comprising the computer implemented steps of:
   creating a backup image of the data in said client computer, wherein the backup image is stored in a location in said client computer; and
   requesting, by a server, the backup image from the location in said client computer for storage on said server.

2. The method of claim 1, wherein the backup image comprises a copy of data files on said client computer.

3. The method of claim 1, wherein the backup image comprises a copy of applications on said client computer.

4. The method of claim 1, wherein the backup image comprises configuration data on said client computer.

5. A method in a distributed data processing system for backing up data from a client computer, the method comprising the computer implemented steps of:
   creating a backup image of data from said client computer within the client computer's file system;
   retrieving at the initiation of a server the backup image from said client computer; and
   storing a plurality of backup images on the server.

6. The method of claim 5, wherein the creating step is initiated by instructions located on said client computer.

7. The method of claim 6, wherein the instructions are a script.

8. The method of claim 5, wherein the retrieving step and the storing step are initiated by instructions on the server computer.

9. The method of claim 8, wherein the instructions are a script.

10. The method of claim 5 further comprising:
    creating a log of activities occurring during the retrieving step.

11. The method of claim 5 further comprising:
    mounting the local file system for use in storing the backup image.

12. The method of claim 5, wherein the step of retrieving is performed asynchronously.

13. The method of claim 5, wherein a number of client computers are present for backup activities and further comprising:
    querying a database of client computers to identify the plurality of client computers.

14. A distributed data processing system comprising:
    a network;
    a plurality of client computers connected to the network, wherein the plurality of client computers each have a file system used to create a backup image and store the backup image on the file system to form a plurality of backup images; and
    a server connected to the network, wherein the server, at the initiation of the server itself, retrieves the plurality of backup images from the plurality of client computers.

15. The distributed data processing system of claim 14, wherein the server identifies the plurality of client computers from which to retrieve backup images by querying a database for identification of the plurality of client computers.

16. The distributed data processing system of claim 14, wherein the server creates a log of activities occurring during retrieval of the plurality of backup images.

17. A data processing system for backing up data from a client computer, the data processing system comprising:
    creating means for creating a backup image of the data in the client computer, wherein the backup image is stored in a location in the client computer; and
    requesting means for requesting, by a server, the backup image from the location in the client computer.

18. The data processing system of claim 17, wherein the backup image comprises a copy of data files on the client computer.

19. The data processing system of claim 17, wherein the backup image comprises a copy of applications on the client computer.

20. The data processing system of claim 17, wherein the backup image comprises configuration data on the client computer.

21. A data processing system for backing up data on a client computer, the data processing system comprising:
    creating means for creating a backup image of data on the client computer within the client computer's file system;
    retrieving means for retrieving, at the initiation of a server, the backup image from the client computer; and
    storing means for storing the plurality of backup images on the server.

22. The data processing system of claim 21, wherein the creating means is initiated by instructions located on the client computer.

23. The data processing system of claim 22, wherein the instructions are a script.

24. The data processing system of claim 21, wherein the retrieving means and the storing means are initiated by instructions on the server computer.

25. The data processing system of claim 24, wherein the instructions are a script.

26. The data processing system of claim 21 further comprising:
    creating means for creating a log of activities occurring during the retrieving step.

27. The data processing system of claim 21 further comprising:
    mounting means for mounting the local file system for use in storing the backup image.

28. The data processing system of claim 21, wherein the means of retrieving is performed asynchronously.

29. The data processing system of claim 21, wherein a number of client computers are present for backup activities and further comprising:

querying means for querying a database of client computers to identify the plurality of client computers.

30. A computer program product in a computer readable medium for backing up data from a client computer, the computer program product comprising:

first instructions for creating a backup image of the data in the client computer, wherein the backup image is stored in a location in the client computer; and second instructions for requesting, by a server, the backup image from the location in the client computer.

31. A computer program product in a computer readable medium for backing up data on a client computer, the computer program product comprising:

first instructions for creating a backup image of data on the client computer within the client computer's file system;

second instructions for retrieving, at the initiation of a server, the backup image from the client computer; and third instructions for storing a plurality of backup images on the server.

32. A method in a data processing system for backing up data, the method comprising:

identifying a client data processing system from which a previously created backup image of data on the client data processing system is to be retrieved;

requesting the previously created backup image from the client data processing system; and storing the previously created backup image in response to receiving the previously created backup image from the client data processing system.

33. The method of claim 32, wherein the identifying, requesting, and storing step are performed for each client of the data processing system.

* * * * *

UNITED STATES PATENT AND TRADEMARK OFFICE
CERTIFICATE OF CORRECTION

PATENT NO. : 6,938,057 B2 Page 1 of 1
APPLICATION NO. : 09/316752
DATED : August 30, 2005
INVENTOR(S) : Gusler et al.

It is certified that error appears in the above-identified patent and that said Letters Patent is hereby corrected as shown below:

Col. 9, line 21: after "Windows" insert --NT--.

Signed and Sealed this

Ninth Day of January, 2007

JON W. DUDAS
*Director of the United States Patent and Trademark Office*